(12) United States Patent
Yoshimoto (10) Patent No.: US 10,939,001 B2
(45) Date of Patent: Mar. 2, 2021

(54) IMAGE FORMING APPARATUS AND NON-TRANSITORY COMPUTER-READABLE RECORDING MEDIUM STORING HOME SCREEN DISPLAY PROGRAM

(71) Applicant: Kyocera Document Solutions Inc., Osaka (JP)

(72) Inventor: Hiroshi Yoshimoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/707,047

(22) Filed: Dec. 9, 2019

(65) Prior Publication Data

US 2020/0195787 A1    Jun. 18, 2020

(30) Foreign Application Priority Data

Dec. 12, 2018   (JP) .................. 2018-233011

(51) Int. Cl.
*G06F 3/12*    (2006.01)
*H04N 1/00*    (2006.01)

(52) U.S. Cl.
CPC ....... *H04N 1/0044* (2013.01); *H04N 1/00411* (2013.01); *H04N 1/00493* (2013.01)

(58) Field of Classification Search
CPC ............ H04N 1/0044; H04N 1/00411; H04N 1/00493
See application file for complete search history.

(56) References Cited

U.S. PATENT DOCUMENTS

| | | | |
|---|---|---|---|
| 2005/0174349 A1* | 8/2005 | Watson ................ | H04N 1/6011 345/427 |
| 2006/0077424 A1* | 4/2006 | Maruta .............. | H04N 1/00347 358/1.15 |
| 2013/0100475 A1* | 4/2013 | Kuroyanagi ......... | H04N 1/0044 358/1.13 |

FOREIGN PATENT DOCUMENTS

JP   2013-090299   5/2013

* cited by examiner

*Primary Examiner* — Moustapha Diaby
(74) *Attorney, Agent, or Firm* — Lex IP Meister, PLLC (57) ABSTRACT

A Multifunctional Peripheral (MFP) includes a display unit that displays information and a printer that prints an image on a recording medium, and when data printable by the printer exists in a specific location, a preview combination home screen including a preview of an image based on the data is displayed on the display unit.

4 Claims, 9 Drawing Sheets

IMAGE FORMING APPARATUS AND NON-TRANSITORY COMPUTER-READABLE RECORDING MEDIUM STORING HOME SCREEN DISPLAY PROGRAM

INCORPORATION BY REFERENCE

This application is based upon, and claims the benefit of priority from, corresponding Japanese Patent Application No. 2018-233011 filed in the Japan Patent Office on Dec. 12, 2018, the entire contents of which are incorporated herein by reference.

BACKGROUND

Field of the Invention

The present disclosure relates to an image forming apparatus that displays a home screen and a non-transitory computer-readable recording medium that stores a home screen display program.

Description of Related Art

Conventionally, as an image forming apparatus that displays a home screen, there has been known an image forming apparatus which includes an operation panel that displays information, a scanner that reads an image from a document, and a printer that can print an image such as an image read from the document by the scanner on a recording medium. When the image forming apparatus reads an image from a document with the scanner, the image forming apparatus displays a home screen including a preview of the image read from the document by the scanner on the operation panel.

SUMMARY

An image forming apparatus of the present disclosure includes a display device that displays information, a printing device that prints an image on a recording medium, and a home screen display unit that displays a home screen on the display device, and when data printable by the printing device exists in a specific location, the home screen display unit displays on the display device the home screen including a preview of an image based on the data that is printable by the printing device and exists in the specific location.

A non-transitory computer-readable recording medium of the present disclosure stores a home screen display program executed by an image forming apparatus including a display device that displays information and a printing device that prints an image on a recording medium, and when data printable by the printing device exists in a specific location, the home screen display program realizes a home screen display unit that displays a home screen on the display device, and the home screen display unit displays on the display device the home screen including a preview of an image based on the data that is printable by the printing device and exists in the specific location.

BRIEF DESCRIPTION OF THE DRAWINGS

FIG. 4 is a flowchart of an operation of the MFP shown in FIG. 1 when a user logs in;

FIG. 6 is a flowchart of an operation of the MFP shown in FIG. 1 for displaying the home screen on the display unit when the authentication function is valid and the user has logged in;

DETAILED DESCRIPTION

Hereinafter, embodiments of the present disclosure will be described with reference to the drawings.

First, the configuration of a Multifunction Peripheral (MFP) as an image forming apparatus according to an embodiment of the present disclosure will be described.

Figure 1:
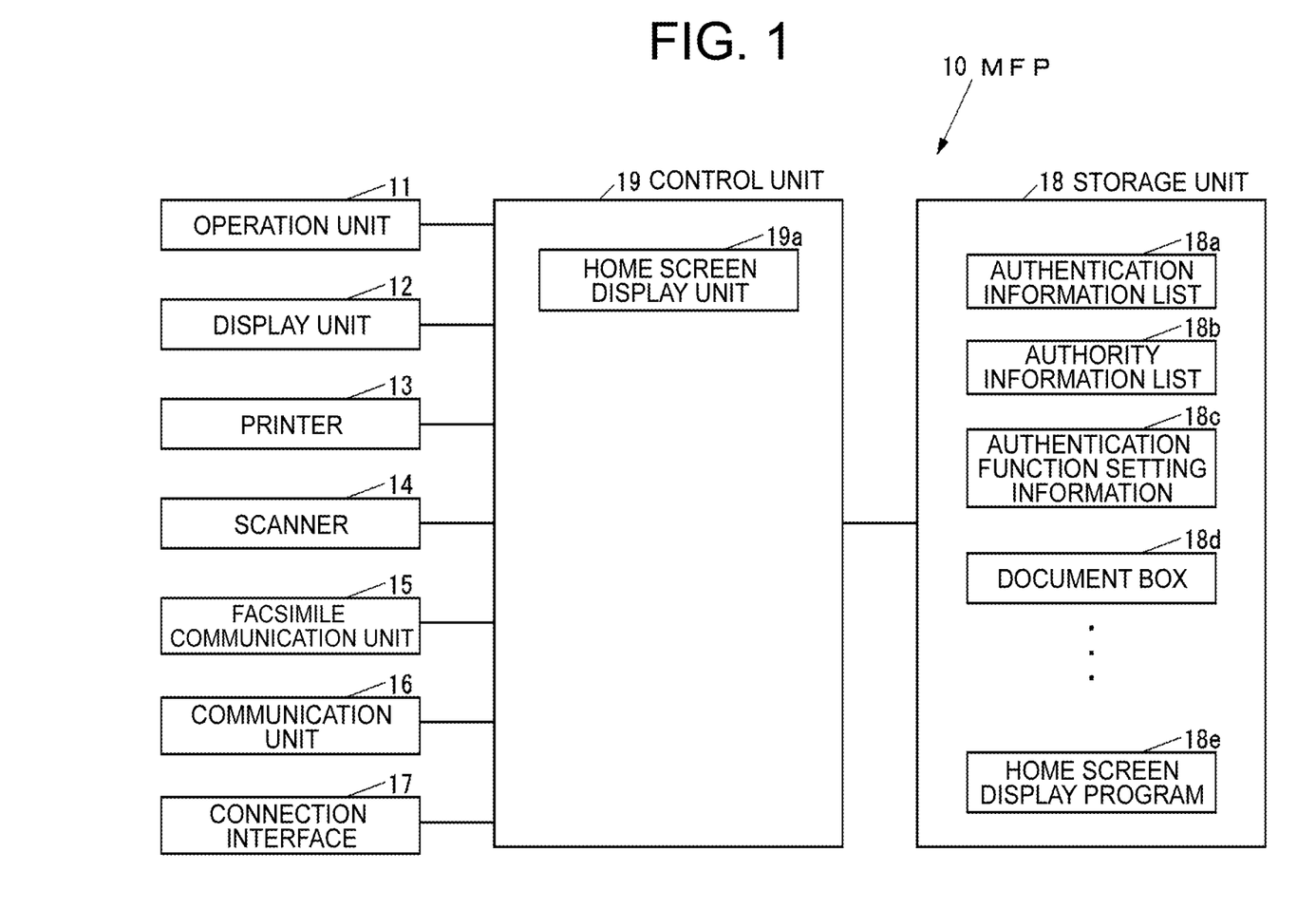
FIG. 1 is a block diagram of a Multifunction Peripheral (MFP) according to an embodiment of the present disclosure.

FIG. 1 is a block diagram of the MFP 10 according to the present embodiment.

As shown in FIG. 1, the MFP 10 includes an operation unit 11 that is an input device such as a button for inputting various operations, a display unit 12 that is a display device such as a liquid crystal display (LCD) for displaying various information, and a printer 13 that is a printing device for printing images on a recording medium such as paper. The MFP 10 further includes a scanner 14, which is a reading device that reads an image from a document, a facsimile communication unit 15 which is a facsimile device that performs facsimile communication with an external facsimile device (not shown) via a communication line such as a public telephone line, and a communication unit 16, which is a communication device that communicates with an external device via a network such as a local area network (LAN) and an Internet, or directly via wired or wireless without intervening the network. The MFP 10 further includes a connection interface 17 such as universal serial bus (USB) port to which an external storage medium such as USB memory is connected, a storage unit 18 that is a non-volatile storage device such as a semiconductor memory or a hard disk drive (HDD) that stores various types of information, and a control unit 19 that controls the entire MFP 10.

The MFP 10 has a function that associates data transmitted from an external computer such as a personal computer (PC) via a printer driver of the computer with the user, temporarily stores the associated data in the storage unit 18, and prints an image based on the data by the printer 13 in response to an instruction from the user via the operation unit 11 (hereinafter referred to as "private print"). The private print is a function that can prevent, for example, a printed material by the printer 13 from being taken away by a third party.

When there is data printable by the printer 13, such as image data, in the external storage medium connected to the connection interface 17, the MFP 10 can print by the printer 13 an image based on the data that exists in the external storage medium connected to the connection interface 17 and can be printed by the printer 13. In addition, the MFP 10 can store an image read from a document by the scanner 14 in the external storage medium connected to the connection interface 17.

The storage unit 18 stores an authentication information list 18a including authentication information for authenticating the user for each user. The authentication information is, for example, information that combines user identification information and user password.

The storage unit 18 stores an authority information list 18b that includes authority information indicating the authority of the user for each user. The authority includes, for example, a general user indicating that it is an ordinary user and an administrator indicating that it is an administrator of the MFP 10.

The storage unit 18 stores authentication function setting information 18c indicating whether the authentication function of the MFP 10 is valid.

The storage unit 18 includes a document box 18d, which is a storage area for storing data of a specific user. In addition to the document box 18d, the storage unit 18 includes document boxes each having the same configuration as the document box 18d for each user. The document box 18d may store data printed by a private print (hereinafter referred to as "private print data").

The storage unit 18 stores a home screen display program 18e for displaying a home screen that is a basic screen for the operation of the MFP 10. The home screen display program 18e may be installed in the MFP 10 at the MFP 10 manufacturing stage, additionally installed in the MFP 10 from an external storage medium such as USB memory, and additionally installed in the MFP 10 from the network.

The control unit 19 includes, for example, a central processing unit (CPU), a read only memory (ROM) that stores programs and various data, and a random access memory (RAM) that is a memory used as a work area for the CPU of the control unit 19. The CPU of the control unit 19 executes programs stored in the storage unit 18 or the programs stored in the ROM of the control unit 19.

The control unit 19 executes the home screen display program 18e to realize the home screen display unit 19a that displays the home screen 20 (see FIG. 2A and FIG. 2B) on the display unit 12.

Figure 2A:
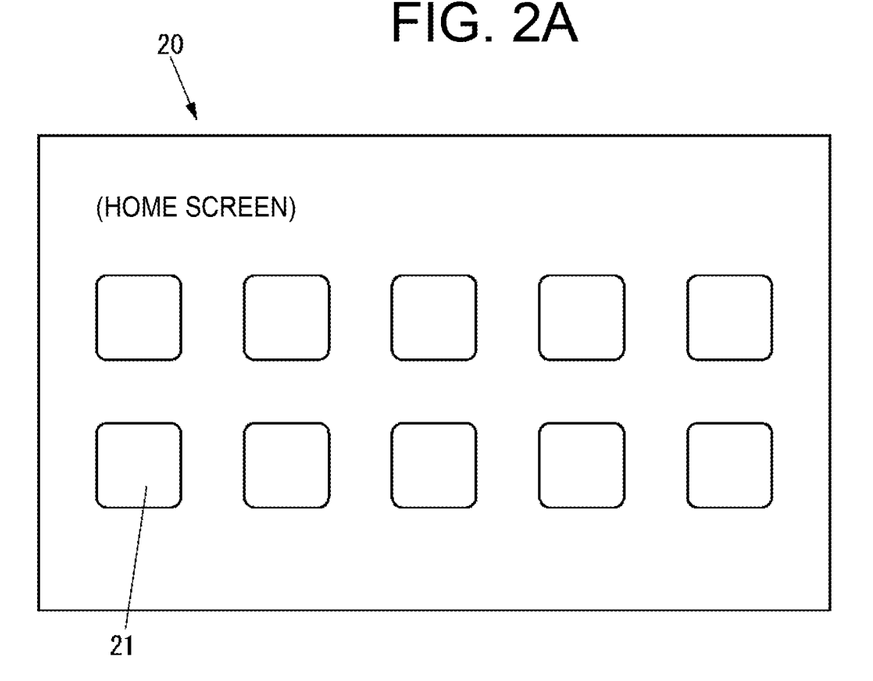
FIG. 2A and FIG. 2B are diagrams showing an example of a home screen displayed on a display unit shown in FIG. 1.
Figure 2B:
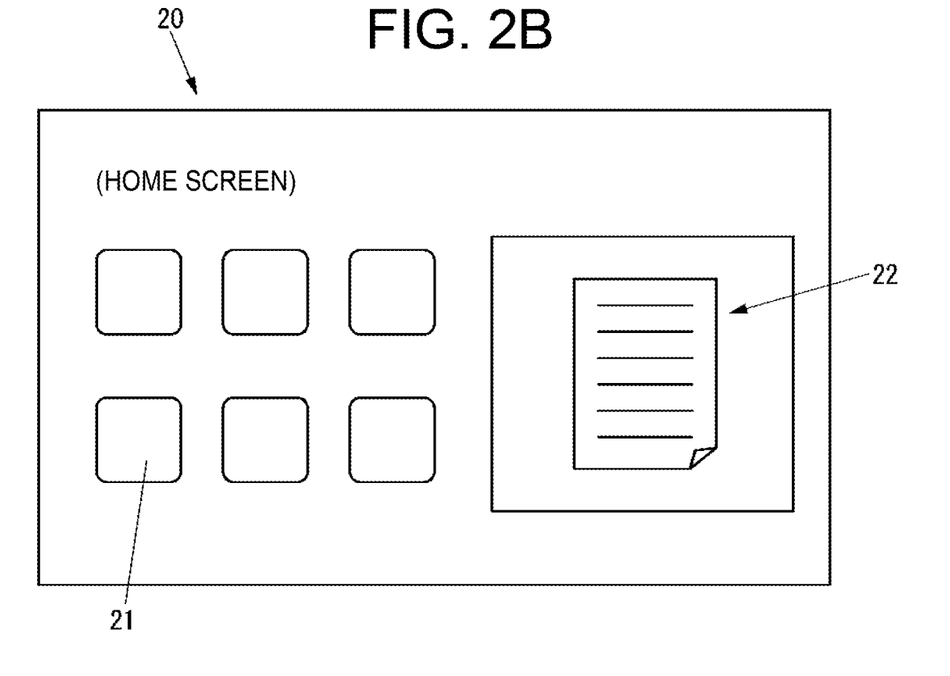

FIG. 2A and FIG. 2B are diagrams showing an example of a home screen 20 displayed on the display unit 12.

The home screen 20 shown in FIG. 2A and FIG. 2B includes an icon 21 for executing a specific process. In addition to the icon 21, the home screen 20 includes icons each having the same configuration as the icon 21 for each process. The home screen 20 includes a normal home screen that does not include a preview of an image based on data printable by the printer 13 (hereinafter referred to as a "normal home screen"), as shown in FIG. 2A, and a home screen including a preview 22 of an image based on data printable by the printer 13 (hereinafter referred to as "preview combination home screen"), as shown in FIG. 2B.

Next, the operation of the MFP 10 will be described.

First, the operation of the MFP 10 when changing to whether the authentication function is valid or invalid is explained.

Figure 3:
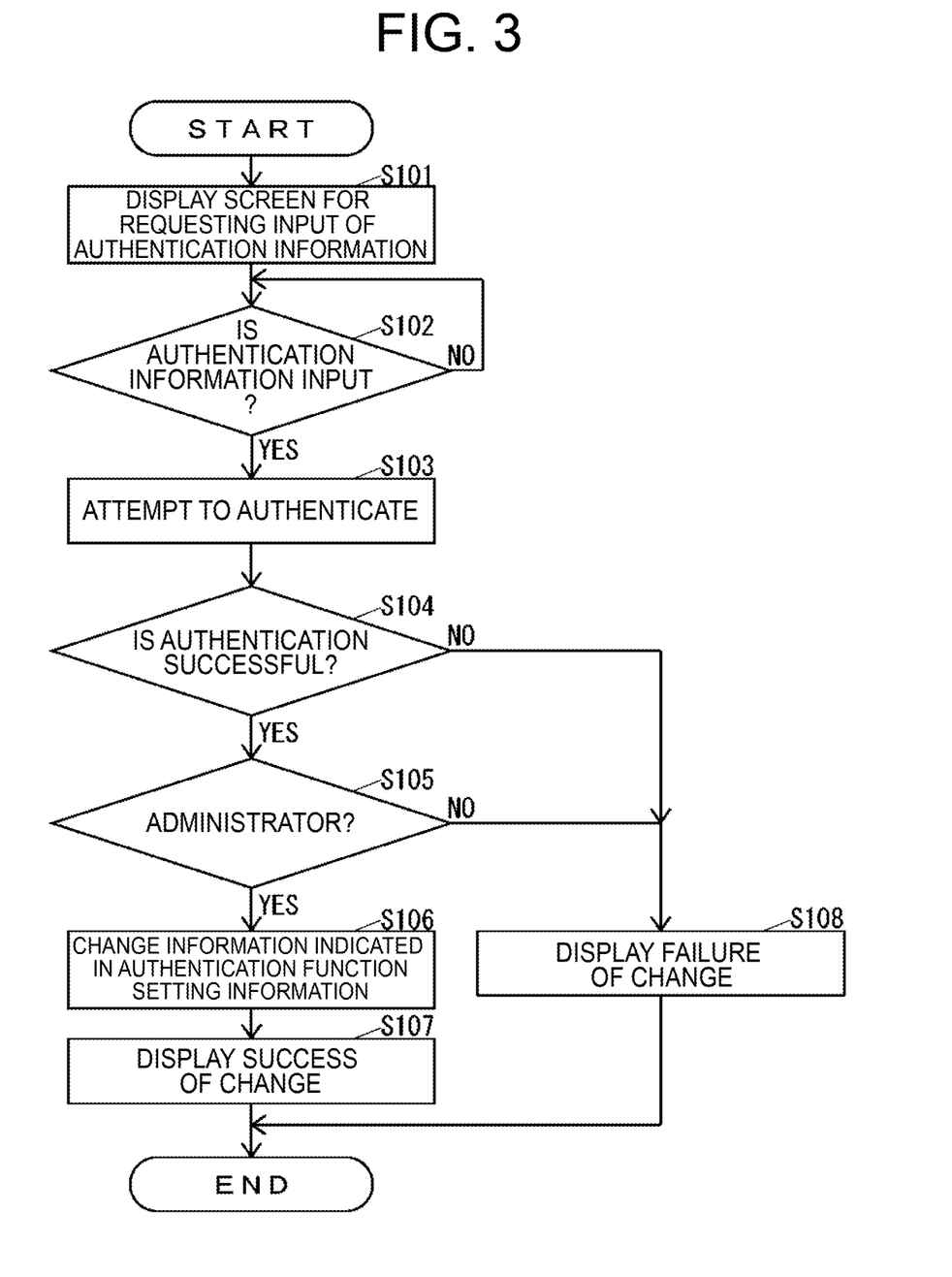
FIG. 3 is a flowchart of an operation of the MFP when changing to whether the authentication function is valid or invalid.

FIG. 3 is a flowchart of the MFP 10 operation when changing to whether the authentication function is valid or invalid.

When an instruction to change to whether the authentication function is valid or invalid is input via the operation unit 11, the control unit 19 performs the operation shown in FIG. 3.

As shown in FIG. 3, the control unit 19 displays a screen for requesting input of user authentication information on the display unit 12 (S101).

Then, the control unit 19 determines whether the authentication information is input via the operation unit 11 until the control unit 19 determines that the authentication information has been input via the operation unit 11 (S102).

When the control unit 19 determines in S102 that the authentication information has been input via the operation unit 11, the control unit 19 attempts to authenticate the user based on the authentication information determined as "input" in S102 and the authentication information included in the authentication information list 18a (S103).

Then, the control unit 19 determines whether the authentication in S103 is successful (S104).

When the control unit 19 determines in S104 that the authentication in S103 is successful, the control unit 19 determines whether the user is an administrator based on the identification information of the user authenticated in S103 and the authority information list 18b (S105).

When the control unit 19 determines in S105 that the user is the administrator, the control unit 19 changes the information indicated in the authentication function setting information 18c (S106). That is, when the authentication function setting information 18c indicates that the authentication function is valid, the control unit 19 changes the information indicated in the authentication function setting information 18c to information that the authentication function is not valid. Further, when the authentication function setting information 18c indicates that the authentication function is not valid, the control unit 19 changes the information indicated in the authentication function setting information 18c to information that the authentication function is valid.

After the process of S106, the control unit 19 displays on the display unit 12 that the change to either the authentication function is valid or invalid is successful (S107).

When the control unit 19 determines in S104 that the authentication in S103 is not successful or determines in S105 that the user is not the administrator, the control unit 19 displays on the display unit 12 that the change to either the authentication function is valid or invalid is failure (S108).

The control unit 19 ends the operation shown in FIG. 3 after the processing of S107 or S108.

Next, the operation of the MFP 10 when a user logs in will be explained.

Figure 4:
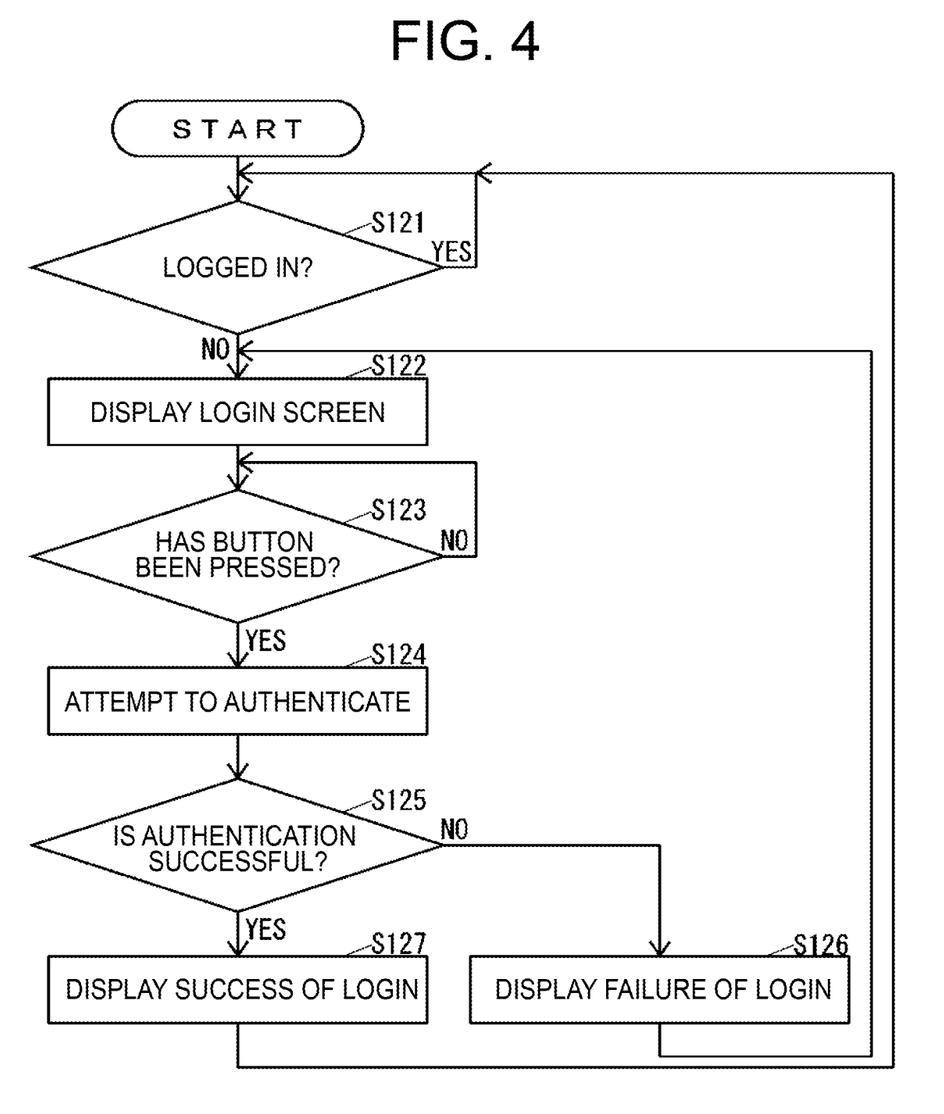

FIG. 4 is a flowchart of the operation of the MFP 10 when the user logs in.

When the authentication function setting information 18c indicates that the authentication function is valid, the control unit 19 performs the operation shown in FIG. 4.

As shown in FIG. 4, the control unit 19 determines whether the user has logged in until the control unit 19 determines that the user has not logged in (S121).

When the control unit 19 determines in S121 that the user has not logged in, the control unit 19 displays a login screen 30 (see FIG. 5) for a user to login in the display unit 12 (S122).

Figure 5:
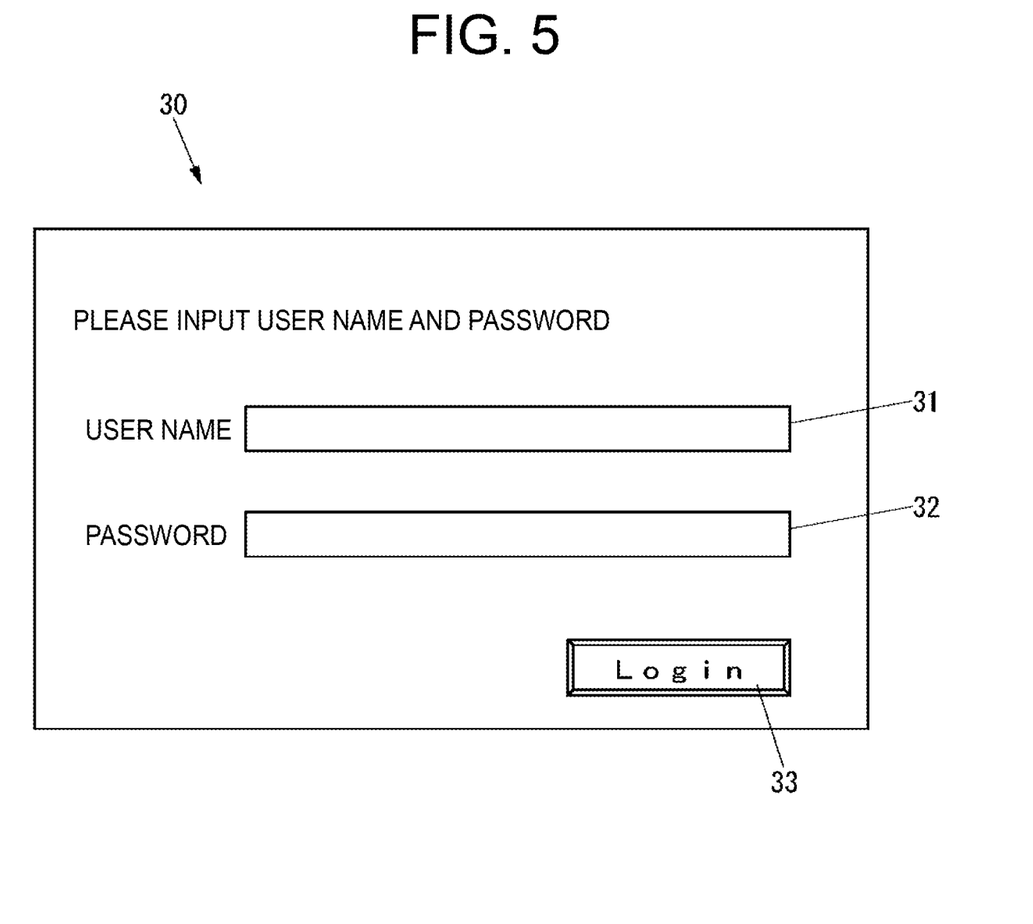
FIG. 5 is a diagram showing an example of a login screen displayed on the display unit shown in FIG. 1.

FIG. 5 is a diagram showing an example of the login screen 30.

The login screen 30 shown in FIG. 5 includes a text box 31 for inputting a user name as user identification information, a text box 32 for entering the user's password, and a button 33 where the login instruction is input.

As shown in FIG. 4, after the process of S122, the control unit 19 determines whether the button 33 has been pressed until the control unit 19 determines that the button 33 has been pressed (S123).

When the control unit 19 determines in S123 that the button 33 has been pressed, the control unit 19 attempts to authenticate the user based on the identification information stored in the text box 31 at the time when the control unit 19 determines in S123 that the button 33 has been pressed, the password stored in text box 32 at the time when the control unit 19 determines in S123 that button 33 has been pressed, and the authentication information in the authentication information list 18*a* (S124).

Then, the control unit 19 determines whether the authentication in S124 is successful (S125).

When the control unit 19 determines in S125 that the authentication in S124 is not successful, the control unit 19 displays the failure of the login on the display unit 12 (S126), and executes the process of S122.

When the control unit 19 determines in S125 that the authentication in S124 is successful, the control unit 19 displays the success of the login on the display unit 12 (S127), and executes the process in S121.

Next, the operation of the MFP 10 for displaying the home screen on the display unit 12 when the authentication function is valid and the user has already logged in will be explained.

Figure 6:
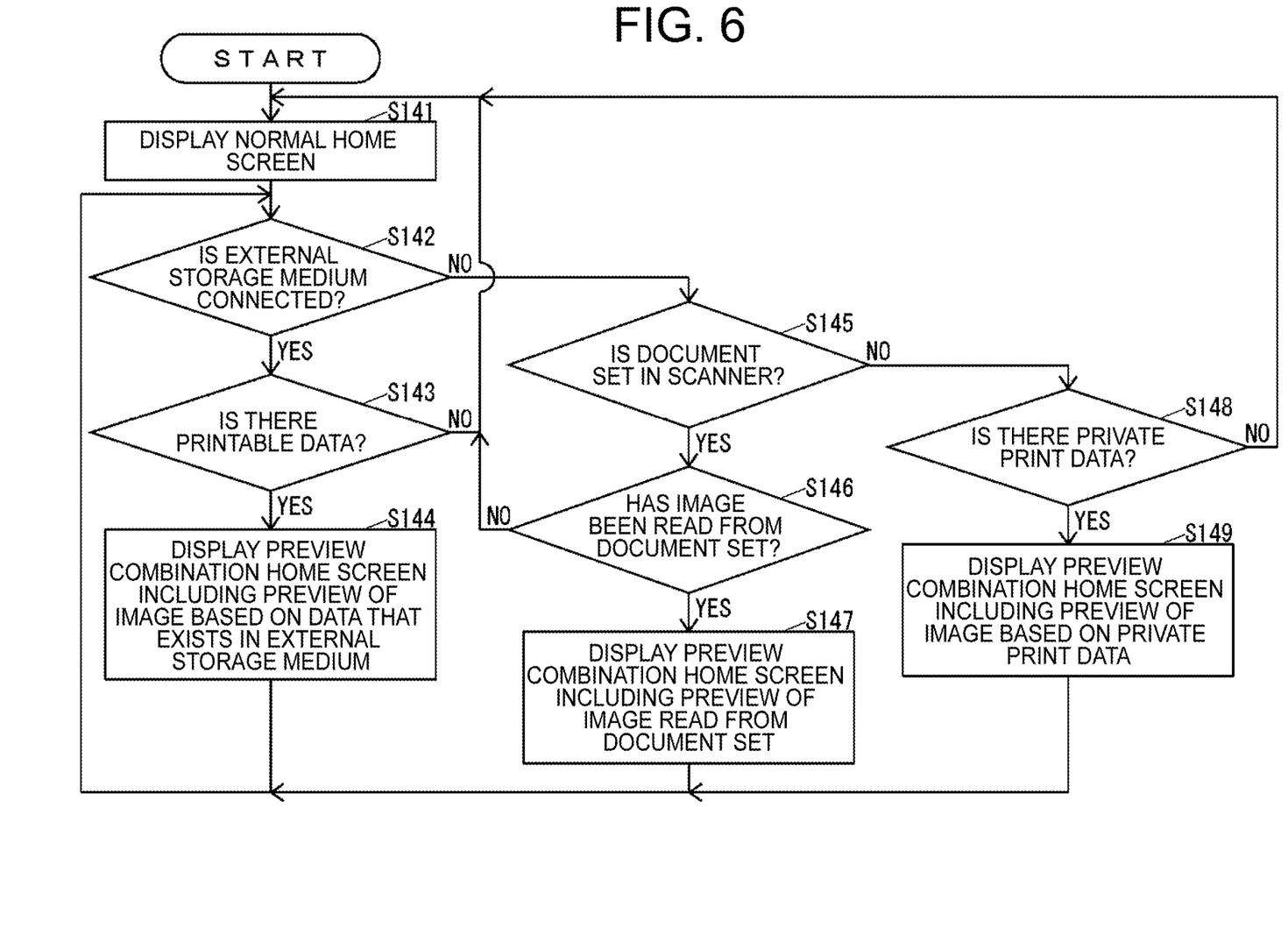

FIG. 6 is a flowchart of the operation of the MFP 10 for displaying the home screen on the display unit 12 when the authentication function is valid and the user has logged in.

When the authentication function setting information 18*c* indicates that the authentication function is valid and the user has logged in, the control unit 19 performs the operation shown in FIG. 6.

As shown in FIG. 6, the home screen display unit 19*a* displays the normal home screen on the display unit 12 (S141).

Then, the home screen display unit 19*a* determines whether an external storage medium is connected to the connection interface 17 (S142).

When the home screen display unit 19*a* determines in S142 that an external storage medium is connected to the connection interface 17, the home screen display unit 19*a* determines whether there is data printable by the printer 13, such as image data, in the external storage medium connected to the connection interface 17 (S143).

When the home screen display unit 19*a* determines in S143 that there is data printable by the printer 13 on the external storage medium connected to the connection interface 17, the home screen display unit 19*a* displays on the display unit 12 the preview combination home screen including a preview of an image based on the data that exists in the external storage medium connected to the connection interface 17 and can be printed by the printer 13 (S144). The home screen display unit 19*a* preferentially adopts an icon for executing processing related to printing such as processing for aggregate printing or double-sided printing by the printer 13 to the image based on the data that is present on the external storage medium connected to the connection interface 17 and can be printed by the printer 13, as an icon on the preview combination home screen displayed in S144.

The home screen display unit 19*a* executes the process of S142 after the process of S144.

When the home screen display unit 19*a* determines in S143 that there is no data printable by the printer 13 on the external storage medium connected to the connection interface 17, the home screen display unit 19*a* executes the process of S141.

When the home screen display unit 19*a* determines in S142 that no external storage medium is connected to the connection interface 17, the home screen display unit 19*a* determines whether a document is set in the scanner 14 (S145).

When the home screen display unit 19*a* determines in S145 that a document is set in the scanner 14, the home screen display unit 19*a* determines whether an image has been read by the scanner 14 from the document set in the scanner 14 (S146). The control unit 19 may be configured to automatically read an image from the document set in the scanner 14 by the scanner 14 when the document is set in the scanner 14. Alternatively, the control unit 19 may be configured to read an image from the document set on the scanner 14 by the scanner 14 in accordance with an instruction via the operation unit 11.

When the home screen display unit 19*a* determines in S146 that the image has been read by the scanner 14 from the document set in the scanner 14, the home screen display unit 19*a* displays on the display unit 12 the preview combination home screen including a preview of the image read by the scanner 14 from the document set on the scanner 14 (S147). The home screen display unit 19*a* preferentially adopts an icon for executing processing related to image reading by the scanner 14, such as a copy process that prints the image read by the scanner 14 using the printer 13, and a process that sends the image read by the scanner 14, as an icon in the preview combination home screen displayed in S147.

The home screen display unit 19*a* executes the process of S142 after the process of S147.

When the home screen display unit 19*a* determines in S146 that the image has not read by the scanner 14 from the document set in the scanner 14, the home screen display unit 19*a* executes the process of S141.

When the home screen display unit 19*a* determines in S145 that no document is set in the scanner 14, the home screen display unit 19*a* determines whether private print data exists in the document box of the logged-in user (S148).

When the home screen display unit 19*a* determines in S148 that private print data exists in the document box of the logged-in user, the home screen display unit 19*a* displays on the display unit 12 the preview combination home screen including a preview of an image based on the private print data existing in the document box of the logged-in user (S149). The home screen display unit 19*a* preferentially adopts an icon for executing processing related to printing such as processing for aggregate printing or double-sided printing by the printer 13 to the image based on the private print data existing in the document box of the logged-in user, as an icon on the preview combination home screen displayed in S149.

The home screen display unit 19*a* executes the process of S142 after the process of S149.

When the home screen display unit 19*a* determines in S148 that there is no private print data in the document box of the logged-in user, the home screen display unit 19*a* executes the process of S141.

Next, the operation of the MFP 10 for displaying the home screen on the display unit 12 when the authentication function is not valid will be described.

Figure 7:
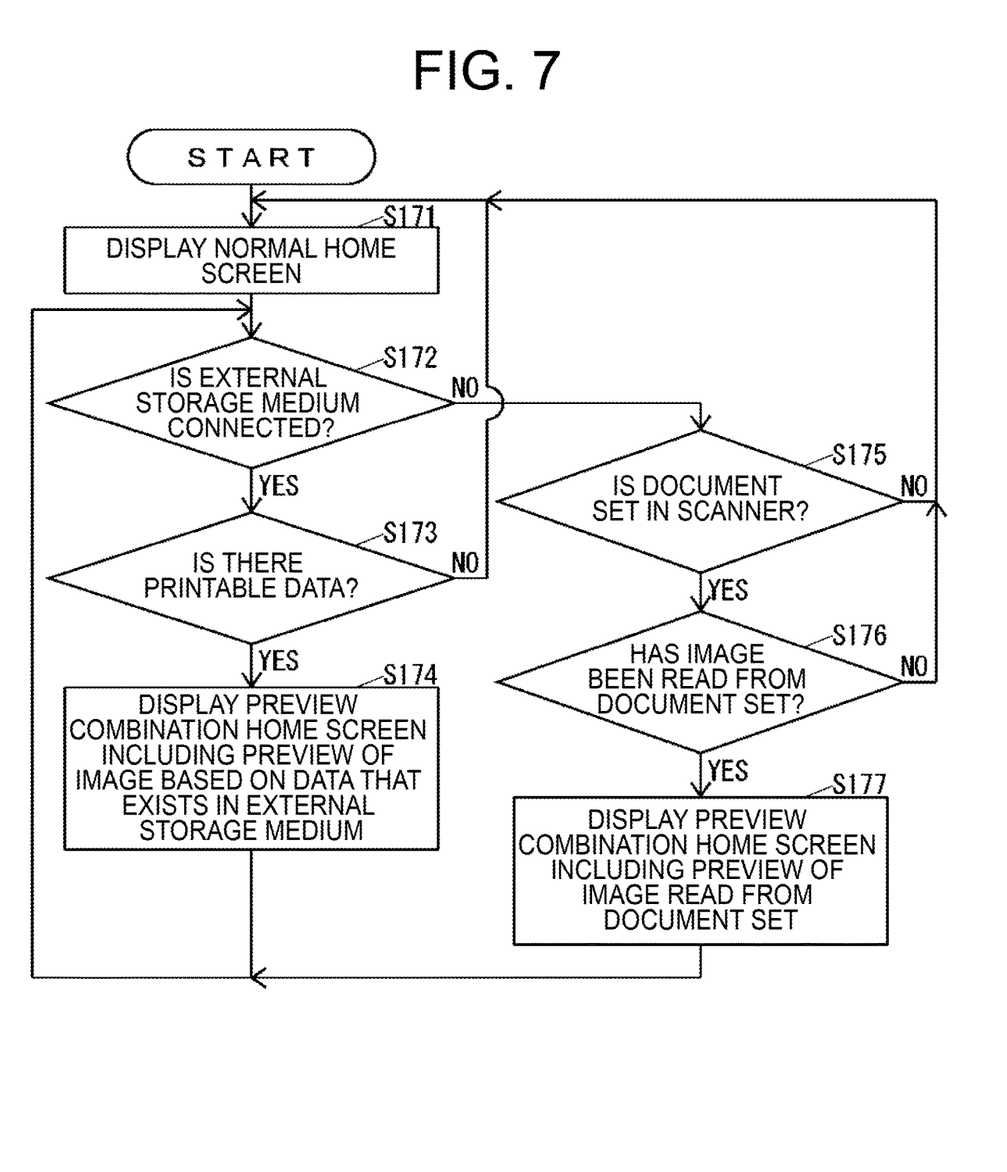
FIG. 7 is a flowchart of an operation of the MFP shown in FIG. 1 for displaying the home screen on the display unit when the authentication function is not valid.

FIG. 7 is a flowchart of the operation of the MFP 10 for displaying the home screen on the display unit 12 when the authentication function is not valid.

When the authentication function setting information 18c indicates that the authentication function is not valid, the control unit 19 performs the operation shown in FIG. 7.

As shown in FIG. 7, the home screen display unit 19a executes the processing of S171 to S177 similar to the processing of S141 to S147. On the other hand, when the home screen display unit 19a determines in S175 that no document is set in the scanner 14, the home screen display unit 19a executes the process in S171.

As explained above, when there is data printable by the printer 13 at a specific location (YES at S143, YES at S148, or YES at S173), the MFP 10 displays the preview combination home screen including the preview of the image based on the data on the display unit 12 (S144, S149 or S174). Therefore, the MFP 10 can improve the usability of the home screen when printable data exists at a specific location.

When a user of the MFP 10 connects an external storage medium that stores data printable by the printer 13 to the connection interface 17, there is a high possibility that the purpose of the user to use the MFP 10 is to print the data printable by printer 13 that exists in the external storage medium connected to the connection interface 17. When there is data printable by the printer 13 on the external storage medium connected to the connection interface 17 (YES in S143 or YES in S173), the MFP 10 displays the preview combination home screen including the preview of the image based on the data on the display unit 12 (S144 or S174). Therefore, the MFP 10 can improve the usability of the home screen when there is data printable by the printer 13 on the external storage medium connected to the connection interface 17.

When there is private print data in the document box of the user of the MFP 10, there is a high possibility that the purpose of the user to use the MFP 10 is to print the private print data. When there is data printable by the printer 13 in the document box for each user (YES in S148), the MFP 10 displays the preview combination home screen including the preview of the image based on the data on the display unit 12 (S149). Therefore, the MFP 10 can improve the usability of the home screen when data printable by the printer 13 exists in the document box for each user.

When an external storage medium is connected to the connection interface 17 (YES in S142), and there is no data printable by the printer 13 in the external storage medium connected to the connection interface 17 (NO in S143), even if data printable by the printer 13 exists in the document box for each user, the MFP 10 displays on the display unit 12 the normal home screen that does not include the preview of the image preview based on the data (S141). Therefore, the MFP 10 can relatively improve the usability regarding the execution of the function using the external storage medium connected to the connection interface 17, by the amount to suppress the display related to the printing function by the printer 13 based on the data existing in the document box for each user.

When a document is set in the scanner 14 (YES in S145), and no image is read by the scanner 14 from the document set in the scanner 14 (NO in S146), even if there is data printable by the printer 13 in the document box for each user, the MFP 10 displays on the display unit 12 the normal home screen that does not include the preview of the image based on the data (S141). Therefore, the MFP 10 can relatively improve the usability regarding the execution of the function using the image read by the scanner 14 from the document, by the amount to suppress the display related to the printing function by the printer 13 based on the data existing in the document box for each user.

Figure 8:
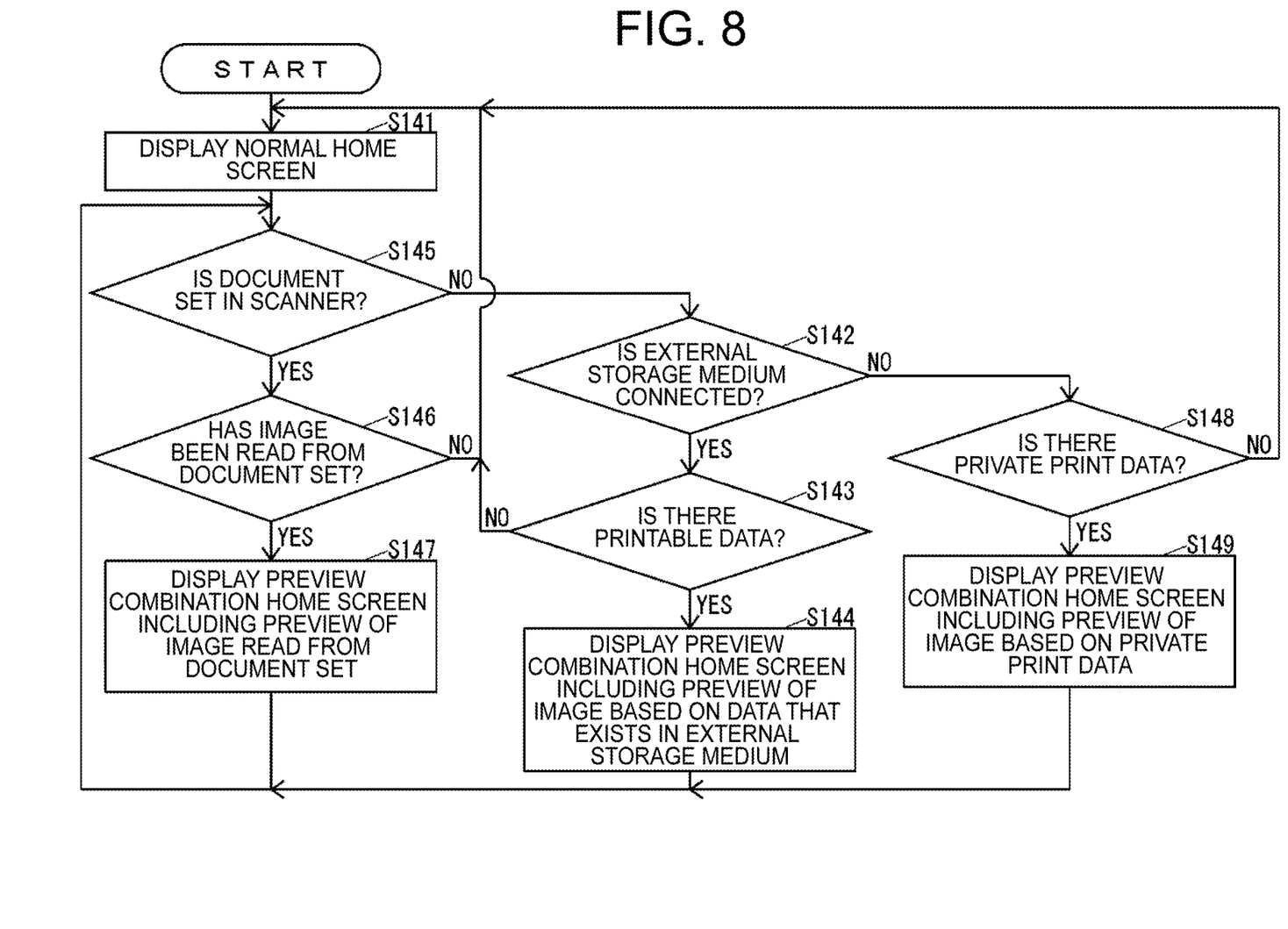
FIG. 8 is a flowchart of a variation of the operation shown in FIG. 6.

In the operation shown in FIG. 6, in displaying the home screen on the display unit 12 in the case where the authentication function is valid and the user has logged in, the MFP 10 has priority over that the external storage medium is connected to the connection interface 17 over that the document is set in the scanner 14. However, as shown in FIG. 8, in displaying the home screen on the display unit 12 in the case where the authentication function is valid and the user has logged in, the MFP 10 may prioritize that the document is set on the scanner 14, over that the external storage medium is connected to the connection interface 17.

Figure 9:
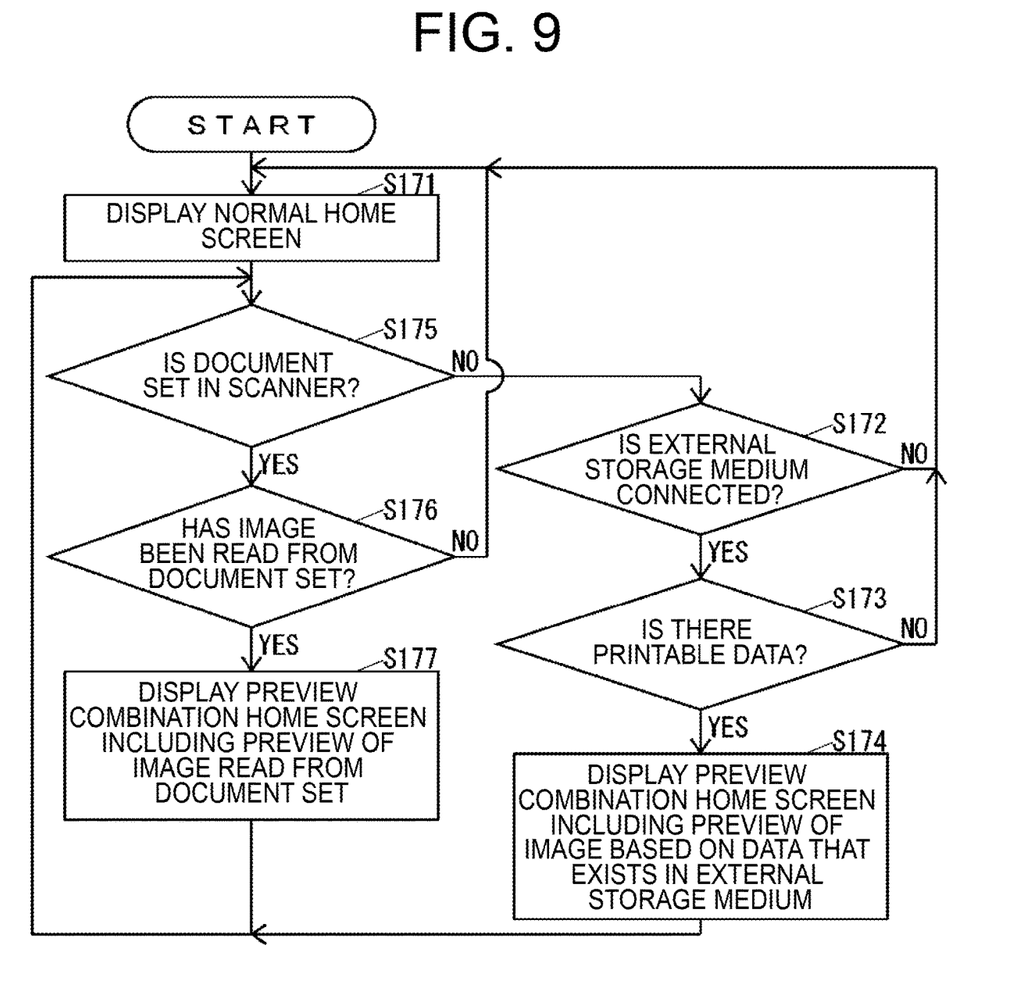
FIG. 9 is a flowchart of a variation of the operation shown in FIG. 7.

In the operation shown in FIG. 7, when the authentication function is not valid, the MFP 10 has priority over that the external storage medium is connected to the connection interface 17 over that the document is set in the scanner 14. However, as shown in FIG. 9, when the authentication function is not valid, the MFP 10 may prioritize that the document is set on the scanner 14 over that the external storage medium is connected to the connection interface 17.

In the embodiment, the MFP 10 stores the authentication information list 18a. However, the MFP 10 may use the authentication information list managed by an external computer. Further, the MFP 10 may request an external computer for the processing of user authentication.

In the embodiment, the MFP 10 stores the authority information list 18b. However, the MFP 10 may use an authority information list managed by an external computer. Further, the MFP 10 may request an external computer for the processing to confirm the user's authority.

The MFP 10 includes the document box in the embodiment. However, the document box may be provided in a computer outside the MFP 10.

The image forming apparatus of the present disclosure is the MFP in the present embodiment, but may be an image forming apparatus other than the MFP, such as a printer dedicated machine.

What is claimed is:
1. An image forming apparatus, comprising:
a display device that displays information;
a printing device that prints an image on a recording medium; and
a home screen display unit that displays a home screen on the display device,
wherein when data printable by the printing device exists in a specific location, the home screen display unit displays on the display device the home screen comprising a preview of an image based on the data that is printable by the printing device and exists in the specific location,
wherein the image forming apparatus further comprises a connection interface to which an external storage medium is connected, and the specific location comprises the external storage medium connected to the connection interface, and
wherein the specific location further comprises a storage area that stores data, for each user, and when the external storage medium is connected to the connection interface, even if data printable by the printing device exists in the storage area, the home screen display unit displays on the display device the home screen which does not comprise a preview of an image based on the data that is printable by the printing device and exists in the storage area.

2. The image forming apparatus according to claim 1,
wherein the image forming apparatus further comprises a reading device that reads an image from a document,
wherein when an image is read from the document by the reading device, the home screen display unit displays on the display device the home screen comprising a preview of the image read from the document by the reading device, and
wherein when the document is set in the reading device, even if data printable by the printing device exists in the storage area, the home screen display unit displays on the display device the home screen that does not comprise a preview of an image preview based on the data that is printable by the printing device and exists in the storage area.

3. A non-transitory computer-readable recording medium that stores a home screen display program executed by an image forming apparatus comprising a display device that displays information and a printing device that prints an image on a recording medium,
wherein the home screen display program realizes a home screen display unit that displays a home screen on the display device, and
wherein when data printable by the printing device exists in a specific location, the home screen display unit displays on the display device the home screen comprising a preview of an image based on the data that is printable by the printing device and exists in the specific location,
wherein the image forming apparatus further comprises a connection interface to which an external storage medium is connected, and the specific location comprises the external storage medium connected to the connection interface, and
wherein the specific location further comprises a storage area that stores data, for each user, and when the external storage medium is connected to the connection interface, even if data printable by the printing device exists in the storage area, the home screen display unit displays on the display device the home screen which does not comprise a preview of an image based on the data that is printable by the printing device and exists in the storage area.

4. An image forming apparatus, comprising:
a display device that displays information;
a printing device that prints an image on a recording medium; and
a home screen display unit that displays a home screen on the display device,
wherein when data printable by the printing device exists in a specific location, the home screen display unit displays on the display device the home screen comprising a preview of an image based on the data that is printable by the printing device and exists in the specific location,
wherein the specific location comprises a storage area that stores data, for each user,
wherein the image forming apparatus further comprises a reading device that reads an image from a document,
wherein when an image is read from the document by the reading device, the home screen display unit displays on the display device the home screen comprising a preview of the image read from the document by the reading device, and
wherein when the document is set in the reading device, even if data printable by the printing device exists in the storage area, the home screen display unit displays on the display device the home screen that does not comprise a preview of an image preview based on data that is printable by the printing device and exists in the storage area.

* * * * *